United States Patent [19]

Busch

[11] 3,787,633

[45] Jan. 22, 1974

[54] MULTIPLEXING ARRANGEMENT FOR A COMMUNICATION SWITCHING SYSTEM

[75] Inventor: John E. Busch, Claredon Hills, Ill.

[73] Assignee: GTE Automatic Electric Laboratories Incorporated, Northlake, Ill.

[22] Filed: Nov. 30, 1972

[21] Appl. No.: 311,027

[52] U.S. Cl. .......................... 179/18 J, 179/15 AT

[51] Int. Cl. .......................................... H04m 3/00

[58] Field of Search 179/15 AT, 15 AQ, 15 BY, 18 J, 179/18 EB, 18 ES, 18 EA, 18 GE, 18 GF

[56] References Cited

UNITED STATES PATENTS

| | | | |
|---|---|---|---|
| 3,517,123 | 6/1970 | Harr | 179/18 ES |
| 3,566,040 | 2/1971 | Lucas | 179/18 ES |
| 3,676,855 | 7/1972 | Tallegas | 179/18 J |
| 3,678,206 | 7/1972 | Dupieux | 179/18 J |
| 3,710,029 | 1/1973 | Grossman | 179/18 J |

*Primary Examiner*—Ralph D. Blakeslee

*Attorney, Agent, or Firm*—B. E. Franz

[57] ABSTRACT

The register-sender subsystem comprises duplicated common logic and memory, and a maximum of 192 register junctors. Each register junctor is assigned an individual time slot in a time division multiplex cycle. The junctor multiplexing apparatus coupling the register-junctors to the common logic is not duplicated; but to minimize the effect of a gate failure the multiplexing apparatus is divided into eight separate groups each providing multiplexing circuits for 24 register-junctors. The groups are designed to be independent of one another. Multiplexing provides for control signals from the common logic to set control latches in buffers of the individual register-junctor during their time slots; and scan signals from the register-junctors set scan latches in the multiplex circuits with eight scan latches in each group, each serving three junctors with OR circuitry from three junctors before the scan latch, and duplicated OR circuitry following the scan latches. The system is normally configured so that one common logic unit serves junctors in even-numbered multiplex groups and the other serves junctors in odd-numbered groups. Reconfiguration makes it possible for either common logic unit to serve the junctors in any group.

16 Claims, 7 Drawing Figures

PATENTED JAN 22 1974

3,787,633

MULTIPLEXING ARRANGEMENT FOR A COMMUNICATION SWITCHING SYSTEM

BACKGROUND OF THE INVENTION

1. Field of the Invention

This invention relates to a communication switching system multiplexing arrangement, and it more particularly relates to such an arrangement for interconnecting selectively a plurality of peripheral units and at least one common logic unit to be shared on a time division multiplex basis.

2. Description of the Prior Art

Multiplexing arrangements have been employed to interconnect on a time division multiplex basis a plurality of peripheral units and a common logic unit in a communication switching system, whereby the peripheral units share the common logic unit thereby to minimize circuit components and more efficiently utilize the equipment. The arrangements have included coincidence logic circuits controlled by address information for scanning purposes to gate signals between the peripheral units and the common logic unit. Such arrangements have not been entirely satisfactory for some applications in that a failure or malfunction of one or more of the logic circuits of the arrangement might cause a large number of or all of the peripheral units to become disassociated from the common logic unit or otherwise become inoperative. Therefore, it would be highly desirable to have a communication switching system multiplexing arrangement which is highly reliable in the sense that a malfunction of its logic circuitry would not normally cause a large number or all of the peripheral units to be affected adversely by the malfunction. Also, such an arrangement should be adapted for use in a system employing a duplicated pair of common logic units for reliability purposes and arranged to selectively interconnect the group of peripheral units with the pair of common logic units and to selectively reconfigure the peripheral units relative to the pair of common logic units.

SUMMARY OF THE INVENTION

The object of this invention is to provide a new and improved communication switching system multiplexing arrangement which is highly reliable and flexible in operation, and which greatly lessens the chance of a malfunction of the arrangement from disabling a large number or all of the peripheral units to be associated with at least one common logic unit on a time division multiplex basis.

Another object of the present invention is to provide such an arrangement which is adapted to be used for multiplexing signals between a group of peripheral units and a duplicated pair of common logic units and enables a reconfiguration of the peripheral units relative to the common logic units in response to a malfunction or other reason.

The invention relates to a system in which duplicate common logic units are normally operated in synchronism, but may be reconfigured to operate with either one of them active and the other off-line. Each of the common logic units has its own timing generator which supplies cyclically recurring time slot signals individual to the plurality of register-junctors. There are a plurality of control signals generated by the common logic units for distribution to the register-junctors in their individual time slots, and there are also scan leads from the register-junctors for supplying signals to the common logic units during the time slots.

According to the invention the multiplex apparatus provides reliability by organizing it into a plurality of independent groups, each of which includes a plurality of buffers individual to the register-junctors, duplicate switch circuits for receiving control and timing signals from the respective common logic units, a fan-out circuit comprising OR function gates with inputs from the two switch circuits and outputs to all of the buffers within the group, and a scanning circuit. The control and timing leads from each common logic unit are coupled in multiple to one of the switch circuits in each group. Within each group there is a configuration latch for the two switch circuits, with inputs from the two common logic units to select one of the two switch circuits within the group to thereby configure the group to operate with the corresponding common logic unit. The timing signals include a set of signals individually designating the groups, with an individual lead from each common logic unit to the corresponding switch circuit in each group. When the timing signal for a group occurs, the switch circuits corresponding to the setting of the configuration latch enables gates within that switch circuit to couple the control and timing signals via the fan-out circuits to the buffers. The buffers contain a plurality of latches corresponding to the control signals, these control latches being reset by one of the timing signals at the beginning of the time slot designating the buffer, and being selectively set later in the time slot in accordance with the control signals. The outputs of these control latches are coupled to the register-junctor individual to each buffer. At least one scan lead from each register-junctor for a particular function is coupled via a gate in its individual buffer during its time slot to an individual input of the scanning circuits. The scanning circuits contain scan latches, at least one of which is set or not during a time slot in accordance with the signal on the scan lead from the corresponding register-junctor, and all of the scan latches are reset toward the end of each time slot in response to timing signals from the fan-out circuits. OR circuits preceding and following the scan latches provide an output for the scan function on an individual lead for each group to the common logic units, supplied in duplicate to each of the common logic units. Each of the common logic units further includes OR circuits to combine the scan leads from the groups to provide one output signal for each scan function for use by the common logic unit.

According to a further feature of the invention parity circuits within each group check the outputs of the fan-out circuits and supply signals to the respective common logic units for checking the operation of the switch and fan-out circuits.

Further according to the invention the number of scan latches provided within each group for each function is less than the maximum number of register-junctors served by the group, for example, in a group serving 24 register-junctors, eight scan latches are provided for each function, with OR circuits for combining the scan leads from three buffers preceding the input of each scan latch, and OR circuits following the outputs of the scan latches provided in duplicate to provide the scan signals to the two common logic units.

Other objects and features of the invention are described in the following detailed description.

CROSS-REFERENCES TO RELATED APPLICATIONS

A system which includes a duplicated pair of common logic units for a pair of register-senders having a group of peripheral units serving as register-junctors, and which is adapted to incorporate the principles of the present invention, is disclosed in U. S. Pat. application Ser. No. 201,851 filed Nov. 24, 1971 by S. E. Puccini for a DATA PROCESSOR WITH CYCLIC SEQUENTIAL ACCESS TO MULTIPLEXED LOGIC AND MEMORY, hereinafter referred to as the REGISTER-SENDER patent application.

DESCRIPTION OF THE DRAWINGS

The above-mentioned and other objects and features of this invention and the manner of attaining them will become apparent, and the invention itself will be best understood, by reference to the following description of an embodiment of the invention, wherein:

Referring to FIG. 1, the multiplex circuits RJM comprise eight groups numbered 0 through 7, each serving 24 register-junctors. For each register-junctor the multiplex circuits include an individual buffer such as RJBO in group 0 connected via cable RJO to its junctor. The numbering scheme is such that the first 48 register-junctors RJO-RJ47 are served by groups 0 and 1, with the first eight in group 0, the second eight in group 1, the third eight in group 0, etc. Similarly, the next 48 register-junctors are served by groups 2 and 3, etc. In the register-sender subsystem of the communication switching system there are two common logic units which are duplicates and normally operated in synchronism. One common logic unit comprises register central control circuits RCC-A and the unit designated RMM-A, while the other common logic units comprise unit RCC-B and unit RMM-B. Interface circuits such as RIJ-A within the unit RCC-A, and cable circuits such as RJC-A1 in the multiplex circuits RJM provide for coupling between the common logic units and the multiplex apparatus.

The multiplex apparatus will be described in further detail after a general description of the telephone switching system and the register-sender subsystem.

General System Description

Figure 2:
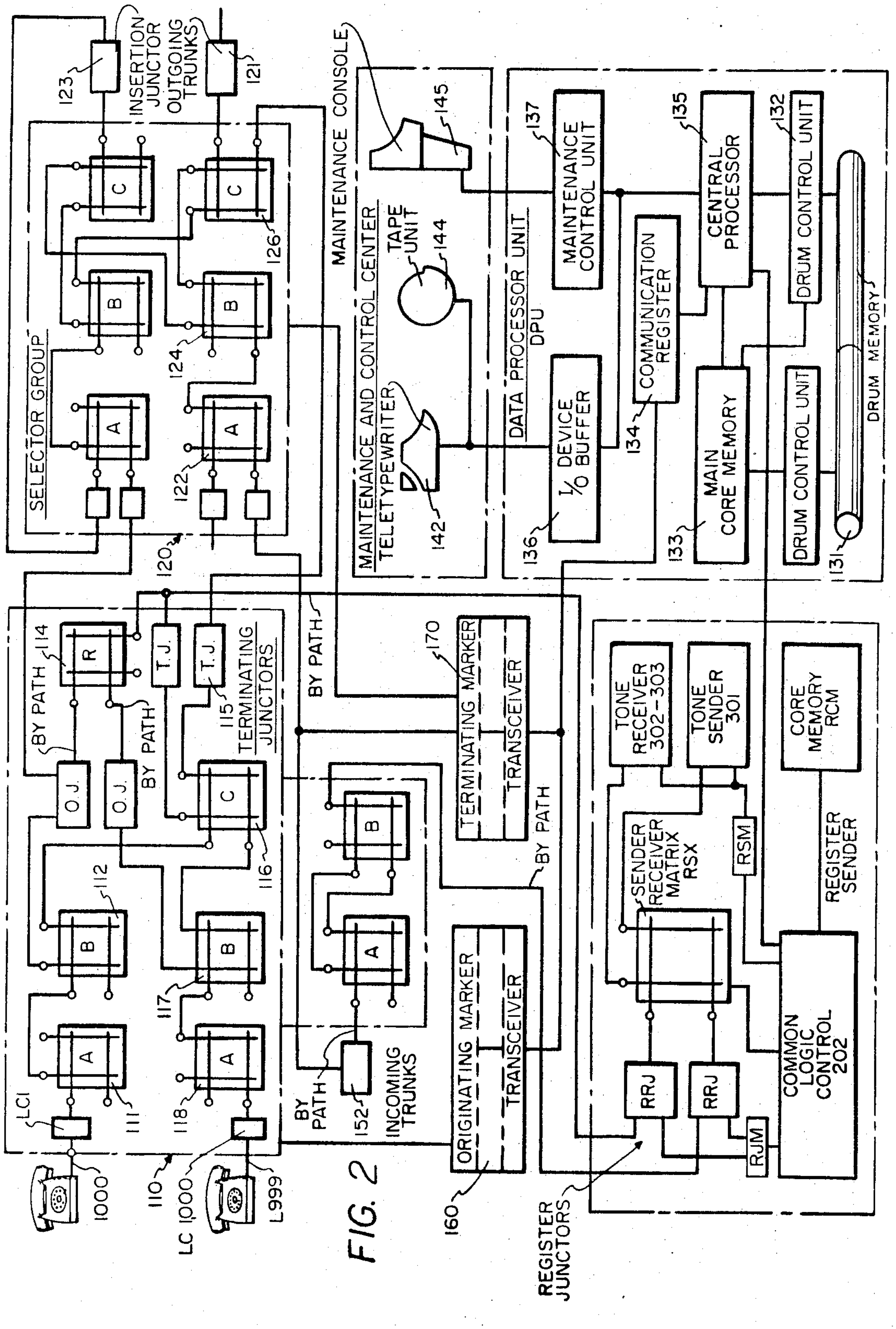
FIG. 2 is a block diagram of a communication switching system incorporating the preferred embodiment of the invention.

The telephone switching system is shown in FIG. 2. The system is disclosed in said REGISTER-SENDER patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000-L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register-junctors RRJ function as peripheral units as an interface between the switching network and the common logic circuits of the register-sender. The ferrite core memory RCM stores the digital information under the control of a common logic 202. Incoming digits may be supplied from the register-junctors via a register receiver matrix RSX and tone receivers 302-303 to a common logic, or may be received in dial pulse mode directly from the register-junctors. Digits may be outpulsed by dial pulse generators directly from a register-junctor or multifrequency senders 301 which are selectively connected to the register-junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register-junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register-junctors. On incoming trunk calls the originating marker 160 detects calls for service in the incoming trunks connected to the trunk register group 150 and controls path selection between the incoming trunks 152 and register-junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical Calls

This part represents a simplified explanation of how three basic call types are processed by the system. The following call type is covered: call from a local party served by one switching unit to another local party served by the same switching unit. For a description of other call types, reference may be made to the REGISTER-SENDER patent application.

In the following presentation, reed relays are referred to as correeds. Not all of the data processing operations which take place are included.

Local Line-to-Local Line Call

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register-junctor. The closed loop from the calling station operates the register-junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register-junctor, plus control and status information. The control and status information is used by the data processor control program in selecting the proper function to be performed on the data frame.

The data processor analyzes the data frame sent to it, and from it determines the register-junctor identity. A register-junctor translation is required because there is no direct relationship between the register-junctor identity as found by the marker and the actual register-junctor identity. The register-junctor number specifies a unique cell of storage in the core memories of both the register-sender and the data processor, and is used to identify the call as it is processeed by the remaining call processing programs.

Once the register-junctor identity is known, the data frame is stored in the data processor's call history table (addressed by register-junctor number), and the register-sender is notified that an origination has been processed to the specified register-junctor.

Upon detecting the pulsing highway and a notification from the data processor that an origination has been processed to the specified register-junctor, the central control circuits of the register-sender sets up a hold ground in the register-junctor. The marker, after observing the register-junctor hold ground and that the network is holding, disconnects from the matrix. The entire marker operation takes approximately 75 milliseconds.

Following the register-junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register-junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register-junctor.

Before the transfer of data to the register-sender memory takes place, the class-of-service information is first analyzed to see if special action is required (e.g., non-dial lines or blocked originations). The register-junctor is informed of any special services the call it is handling must have. This is accomplished by the data processor loading the results of the class-of-service translation into the register-sender memory words associated with the register-junctor.

After a tone receiver connection (if required), the register-junctor returns dial tone and the customer proceeds to key (touch calling telephone sets) or dial the directory number of the desired party. (Party test on ANI lines is performed at this time.)

The register-junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g., ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register-junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register-junctor signals the originating junctor to switch through and disconnects from the path, releasing the R matrix. The originating junctor remains held by the terminating junctor via the selector matrix.

Register-Sender Subsystem

Figure 3:
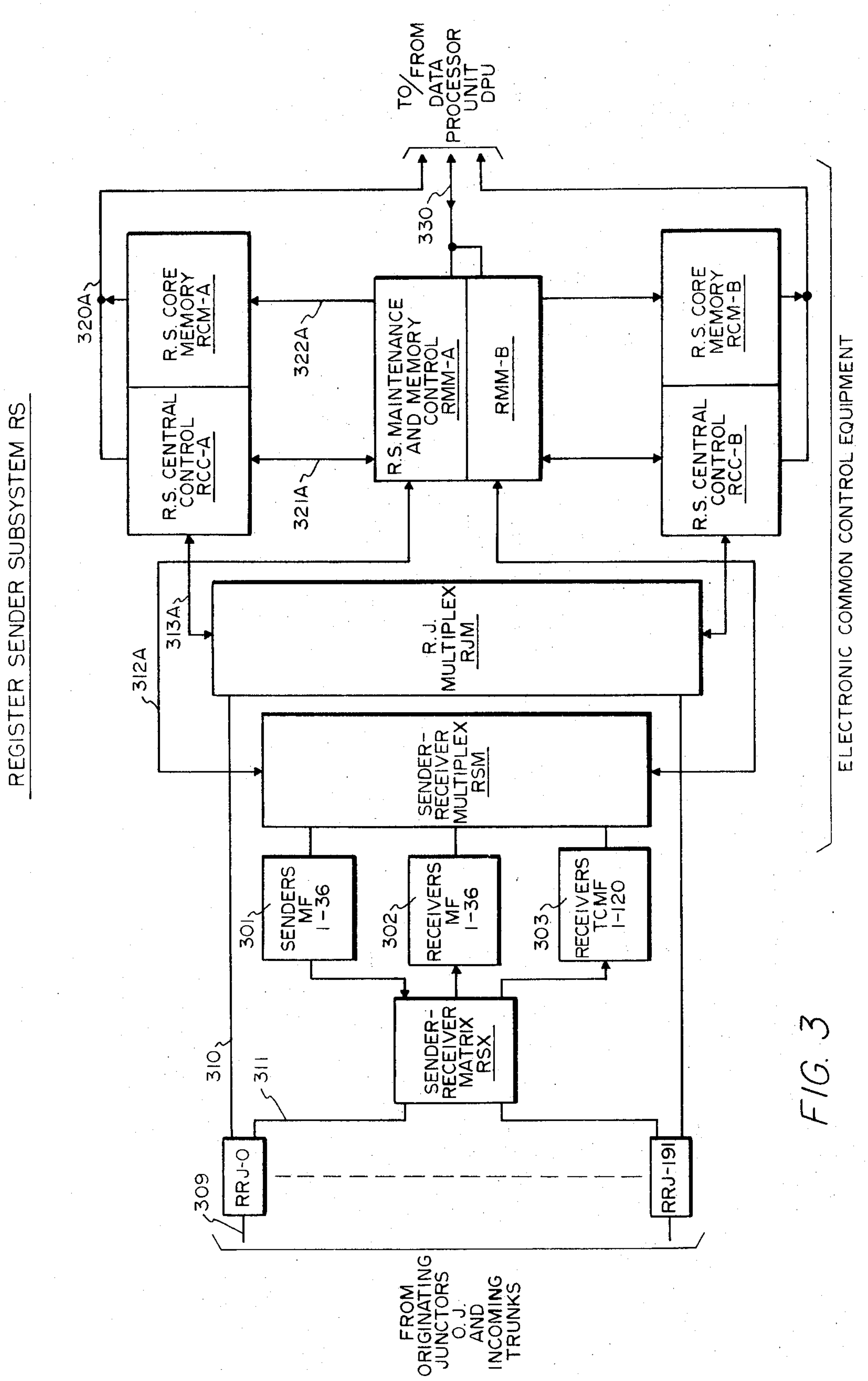
FIG. 3 is a block diagram of the register-sender subsystem of FIG. 2.

Referring to FIGS. 2 and 3, the register-sender RS is a time-shared common control unit with the ability to register and process 192 calls simultaneously from local lines or incoming trunks. The register-sender RS provides the electronic time-shared register apparatus for receiving and storing incoming digits, and pulse generating sender circuitry to forward a call toward its destination. In this regard, the register-sender RS generally includes a plurality of register-junctors RRJO–RRJ191 which are space-divided electromechanical access circuits for providing an interface between the switching matrices of the system and the time-shared register apparatus, which includes the electronic logic of a common logic control 202, a ferrite-core memory RCM to store digits to be received and sent via the register-junctors RRJ, and supervisory information pertaining to the call under the control of the common logic control 202. A sender-receiver matrix RSX selectively connects a plurality of tone receivers and senders 301-303 to the register-junctors RRJ for signaling modes other than the dial pulse mode which is provided for by the register-junctors RRJ.

The time-shared common logic control 202 of the register-sender is duplicated and runs identical operations in synchronism with one another. Under normal conditions, both sets of time-shared equipment are partially active, one set serving one-half of the register-junctors RRJ and the other set serving the remaining half of the register-junctors RRJ. In case of equipment faults, either set of time-shared equipment can serve all of the register-junctors RRJ.

The space-divided equipment of the register-sender includes the register-junctors RRJ, the senders and receivers, and the sender-receiver matrix RSX. The register-junctors RRJ with their associated multiplex equipment RJM provide an interface between the space-divided matrix outlets connected to the register-junctors RRJ and the time-shared common logic control 202. The sender-receiver matrix RSX provides a metallic path from the register-junctors RRJ to the tone senders and receivers under the control of the common logic control 202. The senders 301 provide for sending in the multifrequency mode, and the receivers provide for receiving in either the touch-calling multifrequency mode from the local lines or the multifrequency mode from the incoming trunks 152.

The register-junctors RRJ are the entry and exit point of the register-sender for information transferred between the switching network and the register-sender. The register-junctors enable the register-sender to provide the following features: dial pulse receiving and sending, coin and party testing, line busy, dial tone, and reorder tone application. The incoming and outgoing matrix paths are held by the register-junctors RRJ during call processing. The register-junctors comprise electromechanical components for compatibility with lines, trunks, and switching network circuits, however they also include electronic interfacing circuits which are similar to those in the markers for compatibility with the electronic common logic control 202. Signals from lines, trunks, and network circuits are received by the register-junctors and forwarded to the common logic control for processing.

The common logic control 202 contains the control logic for call processing by the register-sender 200. The purpose of the common logic control 202 is to perform all functions associated with receiving, sending, and timing of digits, and to control processing of calls by generating commands for other circuits in the register-sender and for the switching network. Since the common logic control 202 operates on a time-shared basis to store call processing information in the memory RCM, the common logic control 202 has the ability to register and process 192 simultaneous calls. The common logic control works closely with the core memory RCM which together form the register apparatus of the present invention, and which provides storage of information concerning the calls in progress and information relating to the data processor unit 130.

The core memory RCM is a conventional ferrite core memory, which need not be disclosed in detail. The memory RCM automatically restores the information in the same cores after a read operation, and it likewise automatically clears the information from the cores immediately prior to writing information into them. It is to be understood that the memory RCM could also be any suitable type of non-destructive read-out memory.

The common logic control 202 of FIG. 2 includes duplicated pairs of electronic logic units. As shown in FIG. 3 the common logic comprises a duplicated pair of central control units RCC-A and RCC-B, duplicated core memories RCM-A and RCM-B, and a maintenance and memory control which comprises a duplicated pair of units RMM-A and RMM-B. The units are provided in duplicate for reliability purposes, and each of the duplicated units functions independently as described hereinafter in greater detail. The central control units are connected to the register-junctors via a RJ multiplex unit RJM, and the senders and receivers 301–303 are connected to the maintenance and memory control unit via sender-receiver multiplex unit RSM. The central control unit RCC-A along with core memory RCM-A comprises one frame of equipment, and similarly the units RCC-B and RCM-B are another frame of equipment, while the maintenance control units RMM-A and RMM-B together comprise a frame. The multiplex units each comprise several frames of equipment. The different frames are interconnected via cables which together with driver and receiver circuits terminating them form DC links between the frames.

Figure 4:
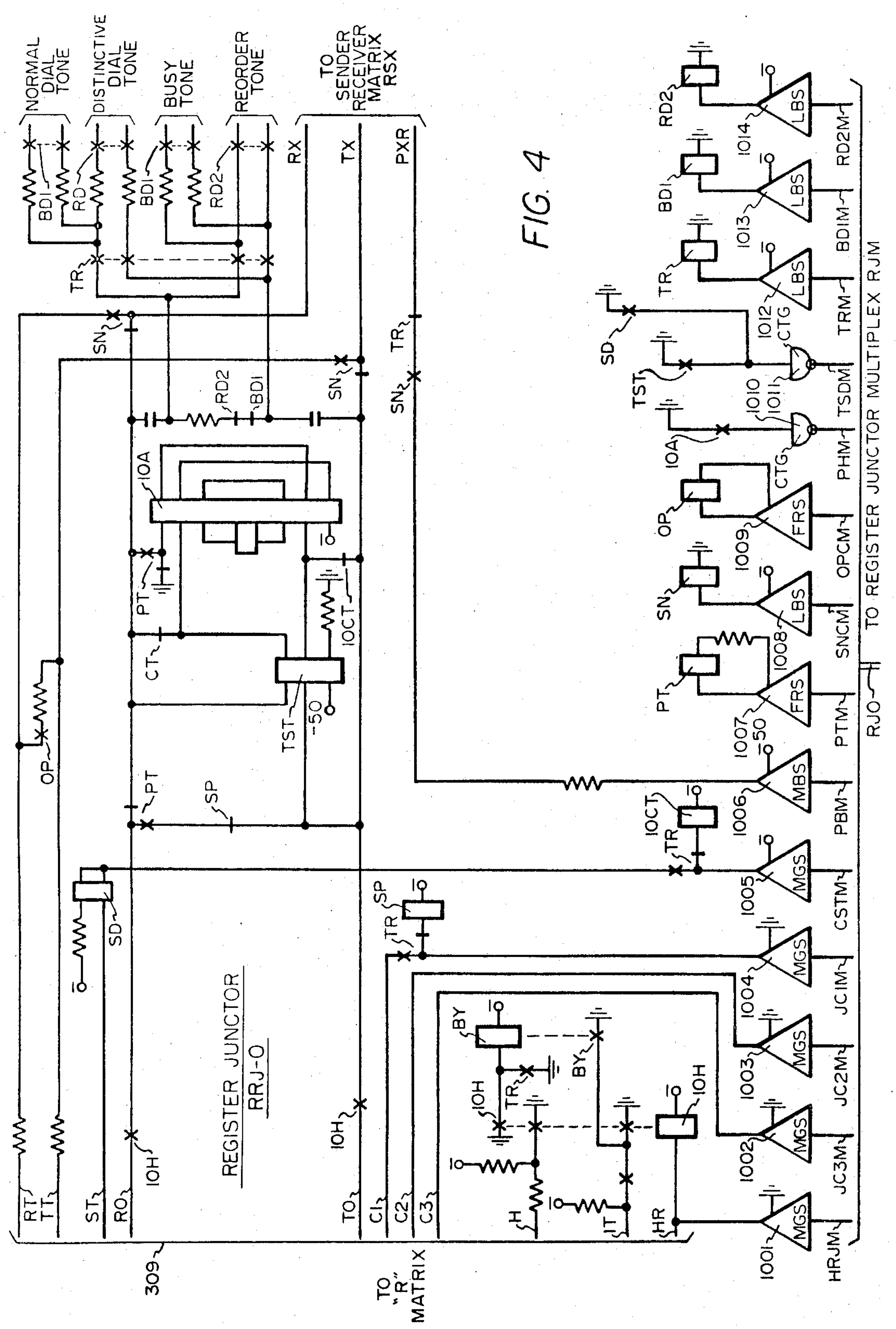
FIG. 4 is a schematic and functional block diagram of a register-junctor.

The RMM frame comprises some maintenance circuits and some of the common logic circuits for call processing. The maintenance circuits consist of a maintenance control unit (FIG. 1), a maintenance data selector and parity generator, and a maintenance comparator as shown in FIG. 4 of the REGISTER-SENDER patent application. The purpose of the maintenance circuits is to supervise overall operation of the common logic circuits of the register-sender subsystem and to accomplish certain maintenance routines under hardware control and direction of the data processing unit.

The maintenance control unit RMU controls the overall operation of maintenance functions with one of the common logic units and is there-fore duplexed, comprising unit RMU-A for operation with the common logic A units, and a corresponding unit as part of RMM-B.

The register timing generator comprising unit RTG-A and in block RMM-A a corresponding unit RTG-B in block RMM-B supplies timing pulses for the multiplex operation of the register-sender subsystem.

Symbolism for Gates and Bistable Devices

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawings by square functional blocks with inputs designated S and R for set and reset respectively; the circuits being in practice implemented generally by two NAND gates with the output of each connected to an input of the other, which makes the circuit a bi-stable device. The latch is also considered as having inverters within the functional block for the S and R inputs.

Relay units such as the register-junctors include interface circuits for signals to and from the electronic frames. These interface circuits are relay drivers and test gates as shown for example at the bottom of FIG. 4. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated RFS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

Register-Junctor and Originating Path

A diagram of a register-junctor RRJ-0 is shown in FIG. 4.

As shown in FIG. 2, the path for a connection is established in a line group between a calling line to a register-junctor and to a selector inlet. The path includes one line circuit LC1, one A stage crosspoint 111, one B stage crosspoint 112, an originating junctor 113, and one R matrix crosspoint 114.

The register-junctor's function is the interface between the subscriber lines and incoming trunks, and the time-shared circuits of the register-sender. The register-junctors are used for digit receiving or sending, tone application, a battery feed device to the calling station, party and coin testing, busy and idle indication to the originating marker, and as a source of hold for the matrix path.

There are two types of register-junctors; the local register-junctors used with the R stage outlet to subscriber lines and paystations, and incoming register-junctors used with incoming trunks and having less complexities than the local register-junctors.

The register-junctor RRJ-0 shown in FIG. 10 is a local register-junctor.

Relay 10H is a reed relay (correed). It is energized by the originating marker applying ground potential to the HR lead. Contacts of this relay connect the tip and ring leads T0 and R0 to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its functions which will cause the register-junctor to eventually be released.

Relay BY is an HQA relay. This relay is normally operated by ground potential via contacts of the H relay, but can also be operated by a busy switch not shown. When this happens it makes the register-junctor busy to the originating marker. Contacts of relay TR will also hold relay BY operated. Relay TR is operated during sequence states PSS=6 to PSS=15 which will be described in the operation of the common logic circuits. Since the relay 10H drops after sequence state PSS=12, relay TR will hold up the relay BY until memory is cleared. Relay BY is slow to release (25 milliseconds) because of a diode not shown across its coil. This makes it the last relay in the register-junctor to release.

Figure 5:
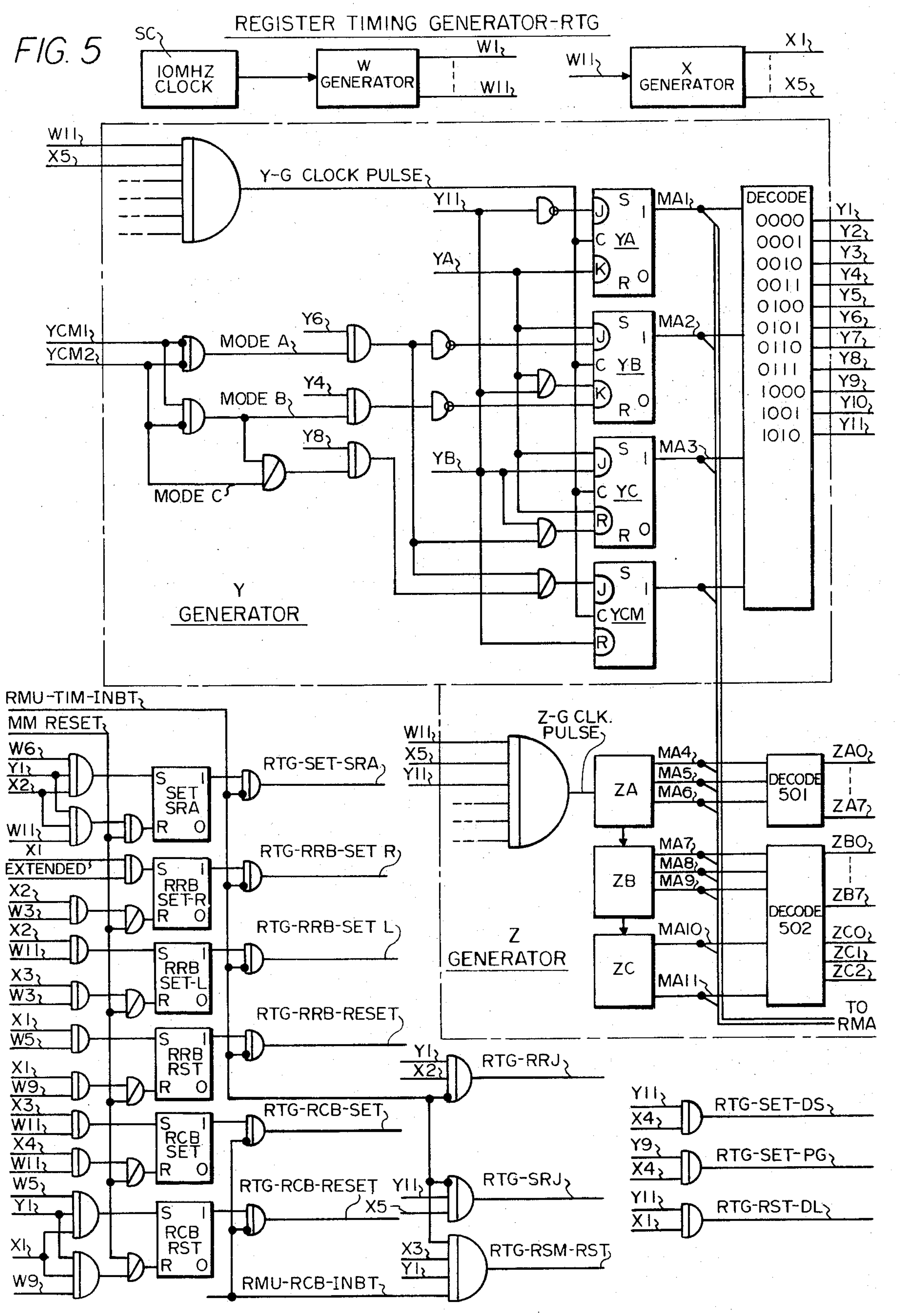
FIG. 5 is a functional block diagram of the register timing generator.

Relay 10A is a single reed relay with three windings. Two of the windings are connected magnetically in series aiding direction while the third is not actively used. Relay 10A is operated under the control of the subscriber loop (or trunk) via the tip and ring leads. After relay 10H has operated connecting the register-junctor to the subscriber line, with the telephone at the subscriber station off-hook closing the path between the T and R leads, relay 10A operates. Contacts of this relay supply ground to a contact test gate 1010, which generates a true signal on lead PHM (pulsing highway) which via the multiplex circuits is supplied to the register controler RRC (FIG. 5). During the reception of dialed digits relay 10A follows the dial pulses which are therefore repeated via lead PHM to the common logic circuits. Relay A is also used in conjunction with relay TST during a party or coin test. When relay 10H releases during sequence state PSS=13, relay 10A is also released.

Relay BD1 is an HQA relay. It may be operated under two sets of circumstances. The first is to return dial tone to the subscriber during sequence state PSS=2 or PSS=3, and the second is to return busy tone to a subscriber line or trunk during sequence state PSS=11, at which time relay TR is operated. This relay is operated via a signal from the multiplex circuits on lead BD1M which operates the relay driver 1013.

Relay RD2 is an HQA relay. It is operated via a signal on lead RD2M operating relay driver 1014 under two sets of circumstances, one being to return distinctive dial tone to a subscriber, and the second being to return reorder tone if relay TR is also operated.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 4 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open a parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started. It is operated for the same 30 milliseconds as PT during coin test.

Relay TST is a mercury wetted reed relay with three windings. This relay is used for coin deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

Relay TR is a HQA relay which is activated during sequence states PSS=6 or greater via relay driver 1012. When operated this relay disables the path for dial tone and enables the busy and reorder tone paths, removes relay CT from the circuit and prepares a path for relay SD, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. Then the terminating marker seizes an "S" relay of the trunk or terminating junctor, relay SD is also operated. Contacts of this relay operate a test gate 1011 to send a logic signal to the register-sender central control via lead TSDM. In response thereto a signal on lead CSTM operates relay driver 1005 to relay SD. When the terminating marker releases, relay SD drops, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Register Timing Generator

The register timing generator RTG is shown by a functional block diagram in FIG. 5.

A 10-megahertz system clock SC is used for the register-sender subsystem as the source for timing pulses. The system clock SC consists of two identical circuits which are wired for redundant operation, so that if one fails the other will continue operation. One circuit functions as the main system clock while the other functions as a standby clock. Both circuits operate continuously but the output of the standby clock is inhibited as long as the main system clock is functioning properly. The system clock that is providing the output pulses furnishes timing pulses to the duplexed register-sender common logic units.

A W generator shown as a single block in FIG. 5 is an 11-flip-flop ring counter, having respective outputs W1 through W11. The W generator uses the 10-megahertz clock SC for its source. Each output pulse from the W generator has a duration of 100 nanoseconds and a cycle rate of 1.1 microseconds.

An X generator shown as a single block in FIG. 5 is a five-flip-flop ring counter, having respective outputs X1 through X5. The X generator uses the 10-megahertz clock output and the signal on lead W11 combined via an AND gate as its source. Each output pulse has a duration of 1.1 microseconds with a cycle rate of 5.5 microseconds.

A Y generator shown in FIG. 5 with more detailed functional blocks comprises three-flip-flops YA, YB and YC, and a separate count modification flip-flop YCM. The Y generator can operate in three count modes. Mode A allows decodes of signals on output leads Y1 through Y6 and Y9 through Y11, mode B permits decodes on output leads Y1 through Y4 and then Y7 through Y11, and mode C provides decoder outputs on Y1 through Y11. The drive circuit for the Y generator is derived from the signals on leads X5, W11, and the clock. The mode of the Y counter is determined by the common logic and maintenance unit circuits. The direct outputs of the flip-flops YA, YB and YC provide signals on the memory address leads MA1, MA2 and MA3 respectively.

A Z generator is an eight-flip-flop binary counter shown in FIG. 5 by three blocks with three-flip-flops in blocks ZA, three-flip-flops in block ZB, and two-flip-flops in block ZC. These flip-flops have respective outputs connected to memory address leads MA4 through MA11. The outputs from the ZA block are decoded by decode circuits 501 as signals on leads ZA0 through ZA7, those form blocks ZB and ZC are decoded by decode circuits 502 as signals on leads ZB0 through ZB7, and on leads ZC0, ZC1 and ZC2. The Z counter is advanced by the output of an AND gate having inputs on leads Y11, X5, W11, and the clock. There are 202 steps of the Z generator 0 through 201, and the cycle time is basically 10 milliseconds.

The timing generator RTG also includes several latches shown in FIG. 5 for supplying set and reset control signals to other latches of the common logic and multiplex circuits.

The timing generator also includes a 100 millisecond timer ITT and a second timer LTT not shown in FIG. 5. The timer ITT is a four-flip-flop binary counter, clocked by the decode of output 201 from the Z generator and upon reaching a binary count of 10 is reset. The one second timer LTT is a four-flip-flop binary counter which is clocked by the decode of output 10 from the 100 millisecond timer and upon reaching a count of 10, resets itself.

MULTIPLEXING ARRANGEMENT RJM

Figure 1:
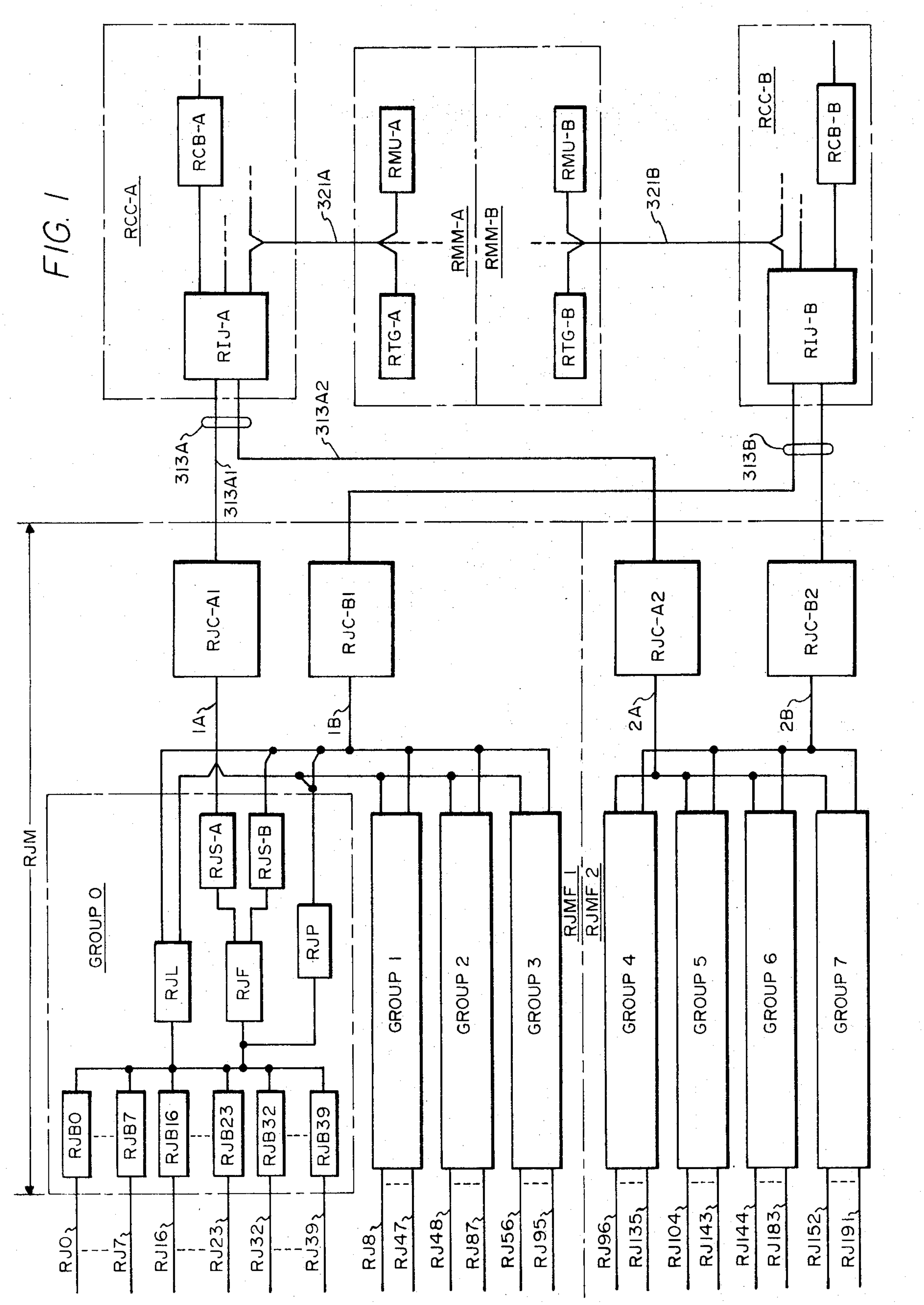
FIG. 1 is a block diagram of the multiplexing arrangement of the present invention.

Referring now to FIG. 1 of the drawings, the multiplexing arrangement RJM is organized into eight groups of two frames with groups 0–3 on frame RJME-1 and groups 4–7 on frame RJMF-2. In each group there are 24 buffer circuits individual to the register-junctors. The numbering scheme for the buffers and register-junctors is shown in Table A. Each buffer has an individual value of the Z digit from the Z generator shown in FIG. 5. The Z digit comprises the memory address bits MA11 through MA4. Binary decoding of the Z digits with a weight of 128 for bit 11 down to a weight of 1 for bit 4 provides a decimal value from 0 through 191. The table shows decoding for eight junctors on each line having the same value of the bits 11-7; with the other three bits 6, 5, 4 comprising the ZA digit decoded by decoder 501 in FIG. 5 providing the digit ZA07. The values of the ZC and ZB digits are derived from bits 11-7 by the decode circuit 502, with values as shown in the table. The ZB digit is used to designate the group in the multiplex circuit with the ZC and ZA digits identifying the individual buffers within each group. Note that a straight-forward binary decoding could have been used with the ZC digit derived from bits 11 and 10 and the ZB digit from bits 9, 8 and 7; which would result in the first eight buffers being in group 0, the next eight in group 1, etc., with 56–63 being in group 7, and then buffer 64–71 being in group 0 again and so on. However, in implementing partially equipped offices it is desirable that the number of groups in the multiplex circuits be kept to a minimum, but with at least two groups being provided for reliablity. With the straight-forward decoding scheme this would result in large gaps in the numbering of the buffers actually equipped. The data processing unit includes tables relating to the buffers, and this straight-forward scheme would result in inefficient use of memory, and might actually require the equipping of additional memory modules with portions unused. Therefore, the numbering scheme shown in Table A was adopted in which the buffers 0–47 are in groups 0 and 1, the next 48 buffers are in groups 1 and 2, etc.

The multiplex circuit RJM in addition to the groups have common cable termination circuits on each frame duplicated for cabling

TABLE A

| Z Decimal | MA Left Bits 11 through 7 | ZC | ZB | ZA |
|---|---|---|---|---|
| 0–7 | 00000 | 0 | 0 | 0–7 |
| 8–15 | 00001 | 0 | 1 | 0–7 |
| 16–23 | 00010 | 1 | 0 | 0–7 |
| 24–31 | 00011 | 11 | | 0–7 |
| 32–39 | 00100 | 2 | 0 | 0–7 |
| 40–47 | 00101 | 2 | 1 | 0–7 |
| 48–55 | 00110 | 0 | 2 | 0–7 |
| 56–63 | 00111 | 0 | 3 | 0–7 |
| 64–71 | 01000 | 1 | 2 | 0–7 |
| 72–79 | 01001 | 1 | 3 | 0–7 |
| 80–87 | 01010 | 2 | 2 | 0–7 |
| 88–95 | 01011 | 2 | 3 | 0–7 |
| 96–103 | 01100 | 0 | 4 | 0–7 |
| 104–111 | 01101 | 0 | 5 | 0–7 |
| 112–119 | 01110 | 1 | 4 | 0–7 |
| 120–127 | 01111 | 1 | 5 | 0–7 |
| 128–135 | 10000 | 2 | 4 | 0–7 |
| 136–143 | 10001 | 2 | 5 | 0–7 |
| 144–151 | 10010 | 0 | 6 | 0–7 |
| 152–159 | 10011 | 0 | 7 | 0–7 |
| 160–167 | 10100 | 1 | 6 | 0–7 |
| 168–175 | 10101 | 1 | 7 | 0–7 |
| 176–183 | 10110 | 2 | 6 | 0–7 |
| 184–191 | 10111 | 2 | 7 | 0–7 |
| 192–199 | 11000 | — | — | 0–7 |
| 200–201 | 11001 | — | — | 0–1 |

to the register central control circuits on the duplicate frames RCC-A and RCC-B. The multiplex frame RJMF-1 has cable circuits RJC-A1 for cabling to the register central control circuits RCC-A and cable circuits RJC-B1 for cabling to the register central control circuit RCC-B; and likewise frame RJMF-2 has the cable circuits RJC-A2 and RJC-B2 for cabling respectively the frames RCC-A and RCC-B. The register central control circuits contain several subunits as explained fully in said REGISTER-SENDER patent application; with the subunits of particular interest therein comprising the interface circuits RIJ-A for the cabling and OR circuits for the scan leads from the groups of the multiplex RJM. Another subunit of particular interest is the carry buffer such as RCB-A in frame RCC-A which supplies the control signals which are multiplexed via the circuits RJM to the reigster-junctors. The interface circuits RIJ-A and other circuits of the register common circuits are also cabled to the frame RMM which contain the duplicated circuits RMM-A and RMM-B. The two subunits of particular interest herein on the RMM frame comprised the timing generator such as RTG-A and RTG-B, and maintenance units RMU-A and RMU-B.

In the multiplex circuits RJM, group 0 is shown in a more detailed block diagram. In addition to the buffers RJB0-7, RJB16-23 and RJB32-39, the group includes latch circuits RJL and fan-out circuits RJF, duplicated switch circuits RJS-A and RJS-B, and parity circuits RJP.

The switch circuits comprise a plurality of gates for supplying control and timing signals to the junctor multiplex group when enabled by a configuration signal. Each of the eight groups is configured to operate with either the A or the B register-sender circuits as controlled by a configuration latch CONFL. The switch circuits are divided into RJS-A for receiving signals from the A circuits and RJS-B for receiving signals from the B circuits. The configuration latch CONFL comprises two NAND gates, gate 612 in RJS-A, and a similar gate not shown in RJS-B.

Figure 7:
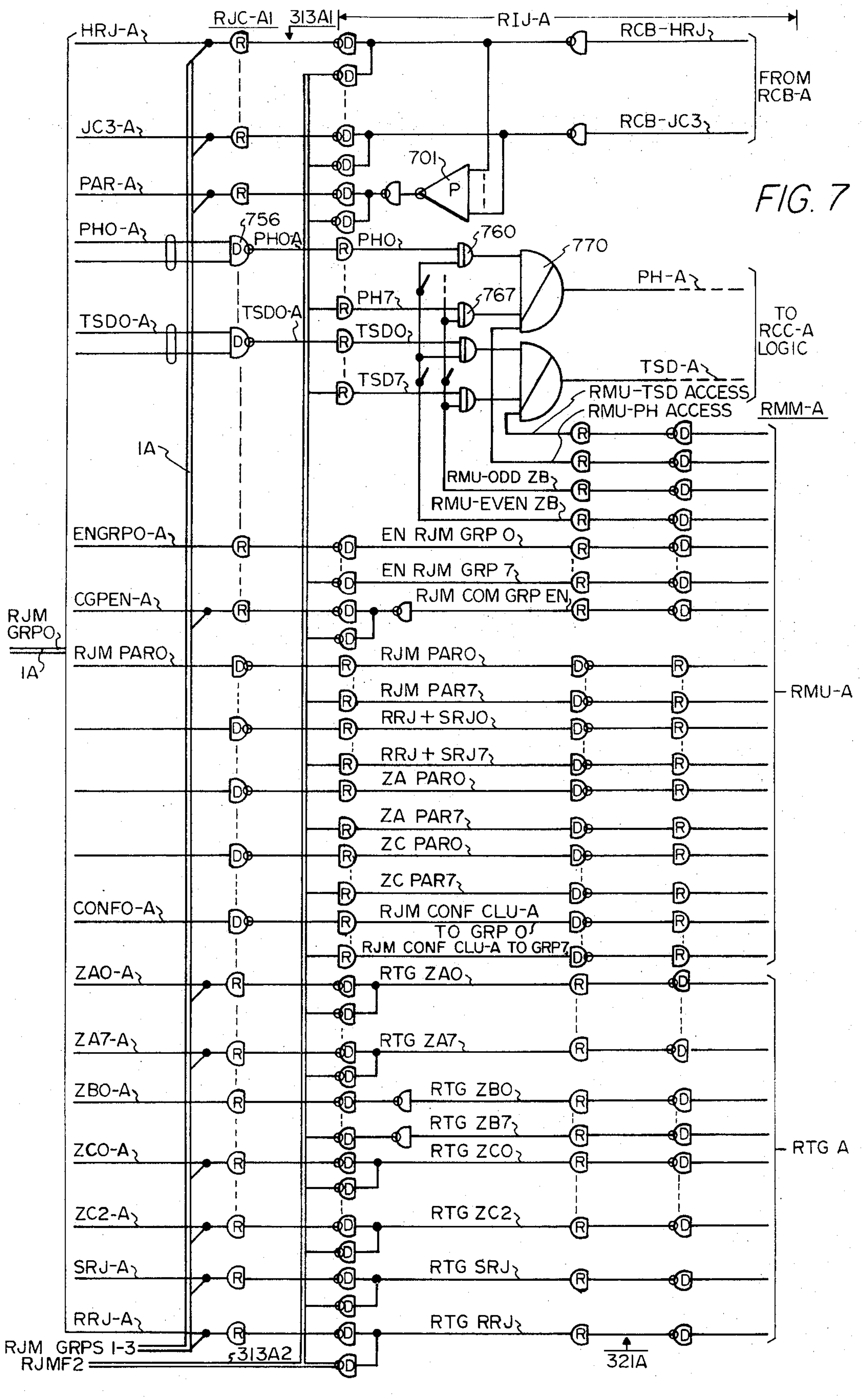
FIG. 7 is a functional block diagram of the cable and interface circuits for the multiplexing arrangement.

Referring to FIGS. 1 and 7, the input signals to the switch circuits RJS-A are received from the timing generator RTG-A, the maintenance unit RMU-A, and the carry buffer RCB-A; all via the register interface junctor circuits RIJ-A and the cable circuits RJC-A1.

FIG. 7 shows the cable drivers designated by a D within a gate, and cable receivers designated by an R within a gate. Note tha the cable drivers are inverting circuits. The signals from the units RTG and RMU are supplied to the interface junctor RIJ-A via the cable 321A, and these signals are then forwarded via cable 313A1 to the junctor multiplex frame RJMF1, and via cable 313A2 to frame RJMF2. Note that some signals are individual to the groups, and some are supplied in multiple to all of the groups, by using two drivers to the cables 313A1 and 313A2, respectively, and then in the cable circuits RJC-A1 connecting in multiple the outputs of the receivers to the four groups within the frame. The signals from the unit RMU include configuration control signals EN RJM GRP 0 through EN RJM GRP 7 for individually selecting the groups, the signal for group 0 at the output of the receiver in the cable circuits RJC-A1 being designated ENGRPO-A. There is also a common group enabling signal lead RJM COM GRP EN which at the output of the receivers in the junctor cable circuit is shown as CGPEN-A. When the signals on leads EN RJM GRP 0 and RJM COM GRP EN are both true then in group 0 via gates 610 and 611 the latch CONFL is set so that the signals to group 0 are selected via RJS-A and the gates in the switch circuits RJS-B are inhibited. The output from gate 612 at the A side of the latch is shown as CONFO-A which is returned via the cable circuits in RJC-A1 and RIJ-A to the unit RMU to verify the configuration. There is a similar signal returned from each of the other groups.

The signals from the timing generator comprise the time slot signals ZA,ZB and ZC and the set and reset signals SRJ and RRJ which are supplied via the interfacing cable circuits as shown in FIG. 7 to the switch circuits in the junctor multiplex groups. Note that the ZB signals are supplied individually to their respective groups, while the ZA and ZC signals are supplied in multiple to all groups.

The carry buffer circuits RCB supply twelve control signals for the register-junctors of which FIG. 7 shows RCB-HRJ and RCB-JC3. These tweleve signals are supplied via the cable circuits to all of the groups in multiple, and also are supplied in the interface unit RIJ-A to parity circuits 701 for determining whether the ones and zeros on the twelve leads have even or odd parity, the output being supplied in multiple to all of the groups, as shown by lead PAR-A to group zero.

In the switch circuits RJS-A, the timing signal ZBO-A along with the configuration signal CONF-A from the latch enables gate 613 to in turn enable the other gates in the switch circuits. The circuits in the switch circuits RJS-B are the same as in RJS-A except that the inputs are from the B circuits of the register-sender, and either the switch circuits RJS-A or RJS-B are enabled depending on the state of the latch CONFL.

The fan-out circuits RJF provide an OR function between the outputs of the switched circuits RJS-A and RJS-B, with their outputs fanned out in multiple of all 24 of the buffers. While FIG. 6 shows a single gate for each lead connected in multiple to the 24 buffer, there are of course in practice a plurality of gates for each lead to provide proper output loading.

Since the fan-out circuits are common to the entire group and are not duplicated, their outputs are checked by the parity circuits RJP. The twelve control signals such as HRJ via gates 621 and 631, along with the parity signals PAR-A via gates 622 and 632 are checked by the parity circuits 641 to provide an output signal on lead RJM-PARO. The signals on the two leads SRJ-A and RRJ-A via gates 623 and 624 and then gates 633 and 634 are supplied via NOR gate 643 to lead −RRJ+SRJO. The signals from the eight ZA0-A leads through ZA7-A via gates such as 625 and 635 are supplied to a parity circuit 645 whose output is on lead -ZA PARO. The signals on the three leads ZC0-A through ZC2-A via gates such as 626 and 636 are supplied to parity circuit 646 whose output is -ZC PARO. The four parity signals are supplied via conductor groups 1A and 1B to both the A and B circuits, the routing through the cable and interface circuits for the A circuits being shown in FIG. 7. Note that there is a set of these four parity signals from each of the eight groups supplied to the maintenance unit RMU.

Figure 6:
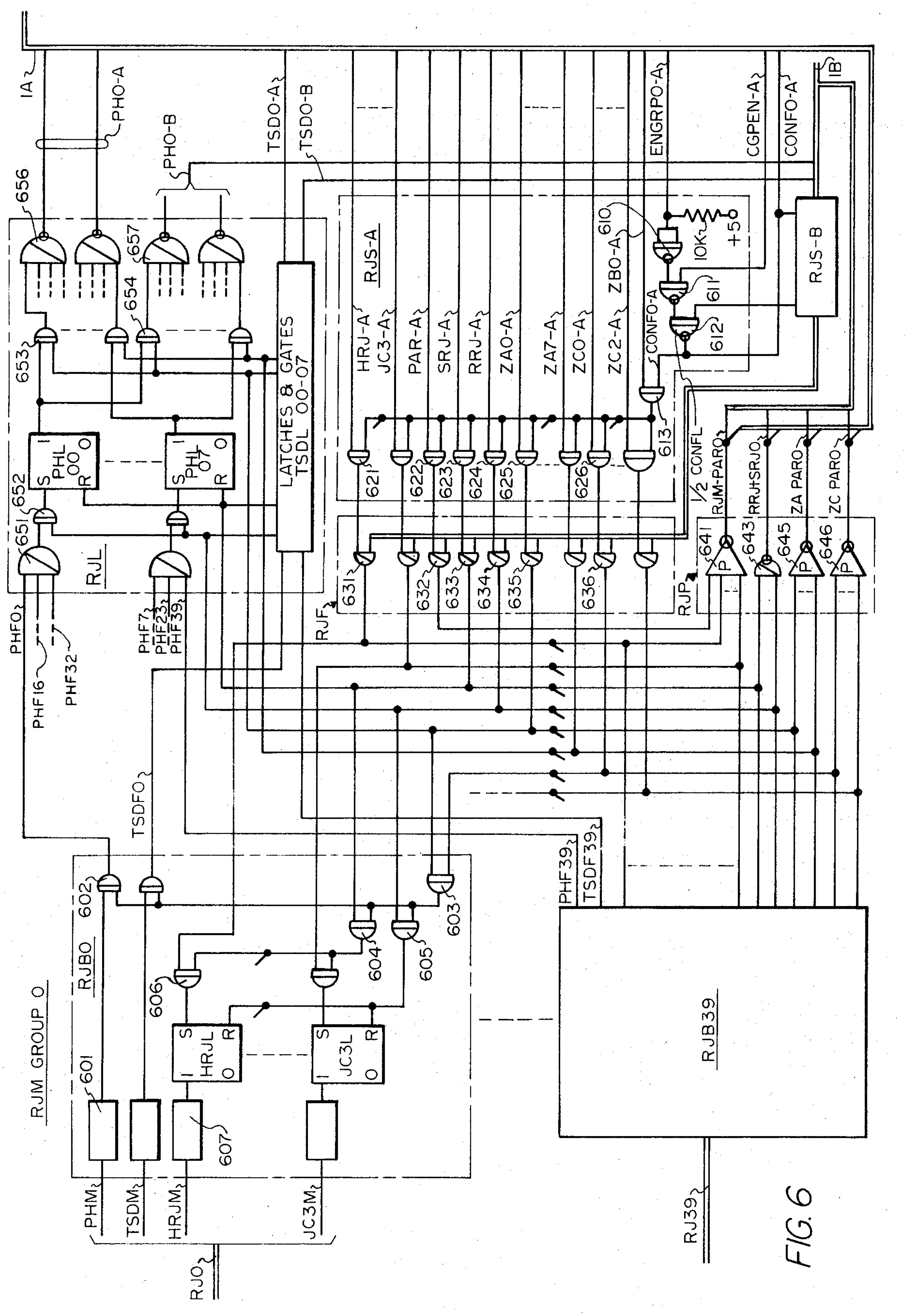
FIG. 6 is a functional block diagram of one group of the multiplexing arrangement of FIG. 1.

One of the buffer circuits RJB0 is shown in detail in FIG. 6. During the time slot for this buffer the signals ZA0-A ZBO-A and ZCO-A are all true. The signal on lead ZBO-A enables gate 613, which in turn enables the gates 625 and 626 for the signals ZAO-A and ZC0-A. The outputs of these gates via the fan-out circuit enables gate 603 in the buffer, which effectively selects this buffer to couple the register central control circuits RCC-A to the register-junctor RRJ0. There are twelve control latches HRJL through JC3L for the twelve control signals from the carry buffer circuits. These twelve latches are all reset at the beginning of the time slot with the signal RTG-RRJ which as shown in FIG. 5 is true during subtime slot Y1 interval X2 of every time slot. The signal is supplied via the cable and interface circuits, thence via the switch and fan-out circuit gates 624 and 634 to an input of gate 605, which in coincidence with the output of gate 603 is effective to supply a signal to reset the latches. During the time slot the register central control circuits RCC-A process information for this register-junctor and selectively set some of the twelve carry buffer latches. The signals are supplied via the interfacing cable circuits and thence via the switch and fan-out circuit to gates in the buffer such as 606 for latch HRJL. Near the end of the time slot the timing generators as shown in FIG. 5 supply a signal on lead RTG-SRJ during subtime slot interval X5. This signal via the cable and interface circuits and the switch and fan-out gates 623 and 633 supply a signal to gate 604 which in coincidence with the output of gate 603 supplies an enabling signal to the twelve gates such as at 606. The twelve latches are then set selectively in accordance with the signals from the carry buffer. The outputs from the latches are supplied via cable interface circuits comprising constant current generators and chokes such as block 607 between latch HRJL and lead HRJM. Note that the latches are in the reset condition during most of the time slot for this buffer and are in the selected condition during the remainder of each multiplex cycle. Thus the signals to the register-junctor are substantially continuous being interrupted during the time slot only. The twelve signals are used as shown in FIG. 4 to enable discrete transistor circuits for supplying ground or battery potential to various relays as shown.

In addition to the twelve leads for controlling the register-junctor, there are two leads PHM and TSDM for scanning its condition. Lead PHM is used via a discrete transistor test gage 1010 to test the condition of relay contact 10A, and lead TSDM is used via a test gate 1011 to test the conditon of either relay contacts TST or SD. In the buffer circuit RJB0 these two leads are coupled via cable interface circuits such as 601 to respective gates such as 602. These later gates are enabled during the time slot by the output of gate 603 to selectively supply signals on leads PHF0 and TSDF0 in accordance with the relay contacts scanned in the register-junctor.

The scan latch circuits RJL for each group comprise eight latches PHL00 through PHL07 for the PH signal condition along with input and output gates; and a similar set of eight latches TSDL00-007 along with input and output gates shown by a single block in FIG. 6. Each of these scan latches serves three register-junctor buffers having the same ZA number. The scan latches are selectively set at the beginning of the time slots and therefore use the signal from lead RRJ-A via gates 624 and 634 to inputs of AND gates such as 652; and are all reset at the end of each time slot using the signal from lead SRJ-A via gates 623 and 633. Latch PHL00 is assigned to the register-junctor buffers RJB0, RJB16 and RJB32, which all use the timing signal ZA0. The output from gate 602 for buffer RJB0 and similar outputs for buffers RJB16 and RJB32 are connected as inputs to an OR gate 651 whose output is supplied via gate 652 to set the latch PHL00 when the signal RRJ-A is true. Similarly each of the other seven PHL latches has inputs from three buffers. While the latches and their input gates are not duplicated, the outputs are divided, with for example the output from latch PHL00 being supplied to an AND gate 653 for the A circuits and also to a gate 654 for the B circuits. For additional reliability these gates are also enabled by the ZA signal corresponding to their latch, namely, signal ZA0 for latch PHL00, and the other ZA signals respectively for the other seven latches. An OR function for the group is formed by two NOR gates 656 along with one of the cable drivers 756 in block RJC-A1. The cable drivers each have two inputs althrough normally only one is used, and when either of these inputs are at 0 the output is 1. Thus the signal on lead PH0 at the output of driver 756 represents the OR function of the outputs of the eight latches PHL00 through PHL07, there being a similar OR function from the same eight latches via eight AND gates such as 654 and two NOR gates 657 along with a driver, not shown, in the circuit RJC-B1 to supply a signal PH0-B.

With circuits similar to those for the PH signals a signal TSD0-A is supplied as shown in FIG. 6 using the eight TSDL latches and their associated gates.

The OR functions for scanning is completed in the interface circuits RIJ-A as shown in FIG. 7. Normally the A circuits operate with junctor groups having an even value of the ZB, namely groups 0, 2, 4 and 6 and ZB circuits operate with the groups having an odd value of ZB, namely, groups 1, 3, 5 and 7. However, either the A or the B circuits may be reconfigured to operate with none or all of the multiplex groups. This is controlled by signals from the unit RMU which via cable circuits supply signals RMU-ODD-ZB and RMU-EVEN-ZB. The signals PH0 through PH7 and the signals TSD0 through TSD7 are connected to respective individual AND gates such as 760 through 767 for the PH signal. The signal RMU-ODD-ZB is used to enable the AND gates from ODD numbered groups such as gate 760; while the signal from lead RMU-EVEN-ZB is used to enable the AND gates from ODD groups such as gate 767. The outputs from the eight gates 760-767 are connected as inputs to an OR gate 770 whose output is lead PH-A; and similarly the AND gates and the OR gate for the TSD signal supplies a signal TSD-A. These two output signals are used in several places within the register central control circuits RCC-A. There are of course a complete duplicate set of circuits in unit RIJ-B for supplying signals PH-B and TSD-B to the logic circuits RCC-B.

There is also an access provided for maintenance purposes from signals generated by the unit RMU-A via the cable circuit supplying signals RMU-PH-ACCESS and RMU-TSD-ACCESS to the respective OR gates to provide the output signals PH-A and TSD-A; along with similar access in the B circuit RMU-B and RIJ-B.

FEATURES OF THE MULTIPLEXING ARRANGEMENT

The parity circuits RJP are provided to monitor leads which are common to an entire group in the multiplex circuits, since the failure on any one of these leads affects the entire group of 24 register-junctors. Therefore the parity circuits are provided to indicate the failure or malfunction to the register maintenance subsystem so that diagnosis and servicing can take place. The parity circuits 641, 645 and 646 in FIG. 6 as well as 701 in FIG. 7 comprise a plurality of EXCLUSIVE OR gates arranged to indicate whether there is an even or an odd number of true signals at the inputs. The parity circuits 645 and 646 could also be comprised of any type of one-out-of-N circuit.

The configuration control in each group provides a latch for selecting the switch circuits RJS for receiving input signals from either the A or the B units of the register-sender. Under normal operation, the A and B units of the register-sender are running in synchronism, and the control signals associated with the even numbered groups are connected on a time division multiplex basis to unit A and the odd numbered groups associated with the unit B. However, the multiplex circuits can be reconfigured to put the entire number of register-junctors of all groups to receive signals from either unit A or unit B. One reason for changing the configuration of the multiplexing arrangement occurs when the register timing generators RTG-A and RTG-B become out of synchronism. In such a case, two of the register-junctors can be addressed simultaneously. As a result, the scanning configuration is set by the common logic unit A to scan only units 0, 2, 4 and 6; and the common logic unit B is set to scan only the remaining groups 1, 3, 5 and 7 until the register timing generators are returned to synchronism or until one of the common logic units is taken off line.

As shown in FIG. 6, the scan latch circuitry RJL also provides for a cost saving in equipment as well as added reliability. The scanning function of the multiplexing arrangement is partially duplicated; whereas, full duplication would be far more costly. The duplication in the multiple arrangement occurs after the scanning leads from the register-junctors connected via input OR gates to the latches and after the latches themselves. The duplication comprises the OR circuitry following the latches in the circuit RJL and of course there is also a duplication of the OR circuitry in the register interface junctors RIJ in the units A and B respectively. The latches are necessary to guarantee that both common logic units scan the same signals simultaneously. If the signals were not latched and the status of the scan signal changed while the common logic units were processing the related junctor information, due to gate propagation delays one of the common logic units could determine a logic level 0 and the other common logic unit could determine the logic level 1. As a result, a mismatch would occur in the common logic units.

The ZA signal is connected to the A and B gates as the outputs of the scan latches to minimize the effect of a failure anywhere backward therefrom so that only three register-junctors would be affected.

In order to minimize the effect of gate failures, the arrangement of the present invention is designed such that the vast majority of the gates are in the register-junctor buffers. Most gate failures therein affect only one register-junctor. Gate failures in the switch and fan-out circuits affect an entire group of register-junctors and thus such failures are more serious. However, the number of gates in these circuits is relatively few and thus an occurrence of this type of failure is rare. In addition, the parity circuits locate this type of failure so that immediate corrective action may be taken, such as replacing the faulty unit.

With the group orientation of the multiplexing arrangement of the present invention, each group is supplied with its own power supply to further provide reliability of operation. If one power supply becomes inoperative, only the 24 register-junctors of a group are affected, but the remaining ones, in other groups, are able to function.

A feature of the configuration control for setting the configuration latch is provided to avoid setting the latch to receive signals from the unit in which the power supply has failed or been turned off. Each group receives from the unit RMU an enabling signal for selecting it, which in unit A comprises the signal leads shown in FIG. 7 as EN RJM GRP 0 through EN RJM GRP 7. If the power supply supplying the signals should be off the signals would become 0, but it has been found that if this signal is used directly to set the configuration latch in the multiplex circuits a brief pulse occurs during the transition while the signal is going to the off condition which sets the latch, thus creating an undesirable condition in which the muliplex circuits are set to receive signals from the unit whose power is off. Therefore the input gating to the latch has been arranged with a NAND gate 610 receiving a signal from the inverted form of the enabled signal, namely, -ENGRPO-A, so that the signal again inverted is supplied at the input of gate 611. In conjunction therewith a common group enabling signal CGPEN-A is supplied to the other input of gate 611. Then upon the failure of the unit supplying these signals, the signal CGPEN-A becomes a 0 so that gate 611 is not enabled and the latch cannot be set to receive signals from the A units. There is a similar set of input gates in the switch circuits RJS-B to prevent the latch being set to the B side if the B unit power supply of the circuit supplying the inputs should fail.

CONCLUSION

The detailed description herein disclosed an arrangement for providing a multiplex function between a common logic unit and 192 register-junctors, with a control function or signal distribution for twelve control leads from the common logic distributed to the register-junctors, and also provides a scanning multiplex function for two scan leads from the register-junctors to the common logic unit. The design is such as to provide a highly reliable system, in an economical manner.

It should be noted that the sender-receiver multiplex RSM shown in FIG. 3 also provides control signal distribution and scanning multiplex functions in a manner generally similar to that disclosed for the register-junctor multiplex RJM. There is a simplified description of the unit RSM in said REGISTER-SENDER patent application.

The junctor multiplex circuit couples the register-junctors to the duplicated common logic units. The two common logic units comprise an A unit including the circuits RCC-A and RMM-A, and a B unit comprising the circuits RCC-B and RMM-B.

Some of the reliability considerations in the design of the junctor multiplex circuits are: (a) guarantee that any single gate failure will not affect both common logic units, (b) guarantee that a power supply failure will not affect both common logic units, (c) minimize the affect of gate failures, and (d) provide means to detect those classes of failures which have a greater effect on the register-sender, namely, those that affect a large number of register-junctors. In order to minimize the effect of a gate failure, or to state it in another way, to minimize the number of register-junctors affected by a gate failure, the junctor multi-plex has been divided into eight separate groups, each group providing multiplexing for 24 register-junctors. These groups have been designed to be independent of one another. This is accomplished by (1) providing each group with its own power supply, (2) routing all necessary control and address signals received from the common logic units to all groups and providing switch circuits that enable a group to be controlled by either common logic unit, and (3) providing individual duplicated scan lead outputs for each group.

The switch circuits RJS-A and RJS-B in each group are provided so that if one of the common logic units is faulty the junctor multiplex circuits can be configured to the good common logic unit. The same consideration is involved for faulty cable receiver cards in a junctor multiplex, or if the power supply that powers either the A or B cable receivers fails or is turned off. Configuration is controlled by means of direct control pulses which are issued from the unit RMU. These signals are sent over the leads shown in FIG. 7 as EN RJM GRP 0 through 7, which are received at each group as inverted signals such as the signal -ENGRP0-A shown in FIG. 6 for group 0. In addition a common group enable lead shown in FIG. 7 as RJM COM GRP EN, and received at the group as shown in FIG. 6 on lead CGPEN-A has been provided to guard against power supply failure in the units RMU or RIJ that would result in erroneous configuration.

Under normal operating conditions, for signal distribution purposes, groups 0, 2, 4 and 6 are configured to the common logic unit A; and groups 1, 3, 5 and 7 are configured to the common logic unit B. For scanning, both common logic units scan all groups. Distribution configuration is changed for those failure conditions wherein a reconfiguration will restore operation, namely, a common logic unit failure. Scanning configuration can be changed in the interface circuit RIJ under control of the unit RMU. This is done for the case of register timing generators out of synchronism. With the timing generators our of synchronism two register-junctors can be addressed simultaneously causing both to be scanned simultaneously. Therefore the scanning configuration is set for a common logic unit A to scan only groups 0, 2, 4 and 6; and common logic unit B to scan only groups 1, 3, 5 and 7 until the timing generators are returned to synchronization or until one common logic unit is taken off line.

The parity circuit RJP has been provided in each group to monitor leads that are common to a number of register-junctors, which number varies, but in a group the maximum number is 24. Since the failure of one of these leads affects a number of register-junctors the parity circuits are provided in order to provide an immediate indication of failure to the unit RMU. Parity is observed on the 12 control leads and a parity leads at the output of the fan-out circuit. Parity is also checked on the seven ZA leads and the three ZC leads. The set and reset leads are "ORed" and return to the unit RMU.

The scanning function in the scan latch circuit RJL is just partially duplicated. The duplication takes place after scan signals from three register-junctors have been ORed together and latched. Thus only one-third as much hardware remains to be duplicated. The latch is necessary to guarantee that both common logic units see the same status of a scan lead. If the signals were not latched, and the status of a scan lead changed while the common logic units were processing related signals from the register-junctor, due to gate propagation delays, one common logic unit could see a logic level 0 and the other a logic level 1. This would cause a mismatch of the common logic unit. The ZA lead is ANDed with the output of a latch to minimize the effect of a failure anywhere backwards from the latch to only three register-junctors.

In order to minimize the effect of gate failures, the junctor multiplex has been designed so that the vast majority of gates are on the buffer cards RJB. Most gate failures on the buffer card will affect only one register-junctor. Gate failure in the switch and fan-out circuits affects a number of register-junctors and thus are more serious; however, the number of gates in these circuits is low and thus occurrence of this type of failure will be rare. In addition, the parity circuit RJP has been provided in order to pinpoint this type of failure so that immediate corrective action can be taken to replace the faulty card.

What is claimed is:

1. Multiplexing apparatus coupling a plurality of register-junctors to two common logic units in a communication switching system, wherein the two common logic units are duplicates of each other and are normally operated in synchronism, but may be reconfigured to operate with either one active and the other off-line; wherein the system includes a timing generator which supplies cyclically receiving time slot signals, with each register-junctor having an individual time slot;

said multiplexing apparatus comprises a plurality of groups;

each group comprises a plurality of buffers each individual to a register-junctor, two switch circuits which are duplicates of each other, a fan-out circuit, and a scanning circuit; means to couple timing signal leads from said timing generator and control signal leads from the two common logic units respectively to the two switch circuits in each group, the leads being coupled in multiple to all groups;

the two switch circuits of each group include a configuration bistable device common to the two configuration control leads from the two common logic units coupled individually to the groups to set the configuration bistable device to select one of the switch circuits for that group, individual group timing signal leads from the timing generators of the two common logic units coupled to the respective switch circuits in each group, selection gate means (613) in each switch circuit of each group to enable it in response to the configuration bistable device being set for that switch circuit and receipt of a timing signal lead, and gate means connected to the selection gate means and to the multiple timing signal leads and control signal leads from the corresponding common logic unit to couple the signal conditions to outputs of the switch circuit;

the fan-out circuit of each group having inputs from both switch circuits to couple the outputs of an enabled switch circuit to all the buffers of the group, and certain timing signals to the scanning circuit;

the buffer circuits each comprise a plurality of control bistable devices having inputs coupled to outputs of the fan-out circuits of the group to reset and selectively set them during the individual time slot of the associated register-junctor in accordance with the signals on the control leads, outputs of the control bistable devices being coupled to the associated register-junctor;

at least one scan lead from each register-junctor coupled to its individual buffer, a scan gate in each buffer enabled during the individual time slot of its register-junctor to couple the signal condition on said scan lead to an input of the scanning circuit of the group;

the scanning circuit of each group comprises scan bistable devices, one of which is selectively set in accordance with the signal condition on the input from the buffer whose time slot is occurring; all of the scan bistable devices being reset toward the end of each time slot, the set and reset being controlled by timing signals from the fan-out circuit of the group; OR function means for each scanning circuit to supply a group common scan output to each common logic unit for said one scan lead signal from the register-junctors;

and common OR function means in each common logic unit to supply a system common scan output for said one scan lead signal from the register-junctors for use in that common logic unit.

2. Multiplexing apparatus as claimed in claim 1, wherein for said one scan lead from each register-junctor, the scanning circuit of each group comprises a number of said scan bistable devices which is fewer than the maximum number of register-junctors served by the group, and wherein said OR function means for each scanning circuit comprises an input gate per bistable device, and common duplicated output gates, with the inputs of the scanning circuits from the buffers being distributed over the input gates, and each input gate being connected via a setting gate to the set input of one of the scan bistable devices, and each of the duplicated output gates having an input coupled from each of the bistable devices, and the outputs of the output gates being connected respectively to the two common logic units.

3. Multiplexing apparatus as claimed in claim 2, wherein there are a plurality of functions to be scanned for the register-junctors, with a separate scan lead for each fjunction from each register-junctor, and separate scan gates for the functions in each buffer, and separate bistable devices with their own input gates and output gates for each scan function.

4. Multiplexing apparatus as claimed in claim 1, wherein the circuits in each group are organized with a large part of the circuits falling within the buffers, wherein a failure affects only its individual register-junctor.

5. Multiplexing apparatus as claimed in claim 4, wherein each of the common logic units includes a parity circuit having inputs from the control signal leads to indicate odd or even parity of the number of 1's, with the output of the parity circuit connected as a parity lead to the switch circuits of all of the groups, and coupled through the switch and fan-out circuits;

and wherein each of the groups includes a parity circuit having inputs from the control leads and parity lead at the outputs of the fan-out circuits to indicate odd or even parity, and additional parity circuits for the timing signal leads at the output of the fan-out circuits, the outputs of these parity circuits of each group being coupled to the common logic units for use in monitoring the operation of the multiplexing apparatus and controlling the configuration.

6. Multiplexing apparatus as claimed in claim 5, wherein each of the groups has its own individual power supply so that a power supply failure affects only the register-junctors of a single group.

7. Multiplexing apparatus as claimed in claim 1, wherein the signals on the configuration control leads from the two common logic units individually to the groups are supplied in inverted form so that the 0 signal condition is used to set the configuration bistable device for operation with a common logic unit, and wherein there is further provided a common configuration control lead connected to all the groups connected so that a 1 signal condition is required thereon to set the configuration bistable device for operation with that common logic unit, to insure that if a power supply fails or is turned off within certain circuits of the common logic units that the configuration bistable devices will not be set for operation with that common logic unit.

8. Multiplexing apparatus as claimed in claim 1, wherein associated with the common OR function means in each common logic unit there are even-odd selection gates between the group common scan output leads from the groups and the inputs of the common OR function means, and an even selection lead connected to the selection gates from even numbered groups and an odd selection lead connected to the selection gates from odd numbered groups, so that each common logic unit may enable its selection gates to operate with even numbered groups, odd numbered groups, or both, the normal operation being to operate with inputs from all groups, and an alternate operation being for each common logic unit to operate with the groups corresponding to the setting of the configuration latches within the groups.

9. Multiplexing apparatus as claimed in claim 8, wherein in the event of the timing generators of the two common logic units becoming out of synchronization, the selection gates of the common logic units are enabled so that each common logic unit accepts scan signals only from groups which have their configuration bistable device set for operation with that common logic unit.

10. Multiplexing apparatus as claimed in claim 1, wherein the timing generator has means to supply the time slot signals in a binary code which is decoded as three digits C, B and A to the timing signal leads, with a number of the least significant bits decoded to N timing signal leads for values from 0 to N minus 1, and the remaining bits have combined decoding for the C and B digits, with M timing signal leads 0 to M minus 1 for the B digit and L timing signal leads with values 0 to L minus one for the C digit, there being a maximum of M groups with a maximum of L times N register-junctors served by each group, with the A and C timing signal leads coupled in multiple to all groups and the B timing signal leads coupled individually to the groups, with the designation for each group corresponding to the value of its B digit;

the decoding of the C and B digits being such that in the order of increasing binary values of the time slot designations, sets of two times N register-junctors have C digit values from 0 to L minus one and then repeating the sequence, and the B digit value for sets of N register-junctors alternates between 0 and 1 for the first two times L times N register-junctors, then alternating between 2 and 3 and so on up to alternating between M minus two and M minus one for the last two times L times N register-junctors;

so that for partially equipped multiplexing apparatus it may be provided in odd-even pairs with only as many pairs as required for the number of register-junctors equipped, with little or no gaps in the binary number sequence of the register-junctors equipped.

11. Multiplexing apparatus as claimed in claim 10, wherein for said one scan lead from each register-junctor, the scanning circuit of each group comprises N of said scan bistable devices, and wherein said OR function means for each scanning circuit comprises an input gate per bistable device, and common duplicated output gates, with the inputs of the scanning circuits from the buffers being connected with L inputs for register-junctors having the same value of the A timing digit input gate, and each input gate being connected via a setting gate to the set input of one of the scan bistable devices, and each of the duplicated output gates having an input coupled from each of the bistable devices, and the outputs of the output gates being coupled respectively to the two common logic units;

with the coupling between the outputs of the scan bistable devices and the inputs of the output gates including gates having enabling inputs from the A timing signal leads corresponding to the A digit for the register-junctors whose buffer scan signal leads are connected to the input gates for the scan bistable devices.

12. Multiplexing apparatus as claimed in claim 11, wherein there are a plurality of functions to be scanned for the register-junctors, with a separate scan lead for each function from each register-junctor, and separate scan gates for the functions in each buffer, and separate bistable devices with their own input gates and output gates for each scan function.

13. Multiplexing apparatus as claimed in claim 12, wherein each of the common logic units includes a parity circuit having inputs from the control signal leads to indicate odd or even parity of the number of 1's, with the output of the parity circuit connected as a parity lead to the switch circuits of all of the groups, and coupled through the switch and fan-out circuits;

and wherein each of the groups includes a parity circuit having inputs from the control leads and parity lead at the outputs of the fanout circuits to indicate odd or even parity, and additional parity circuits for the timing signal leads at the output of the fan-out circuits, the outputs of these parity circuits of each group being coupled to the common logic units for use in monitoring the operation of the multiplexing apparatus and controlling the configuration.

14. Multiplexing apparatus as claimed in claim 13 wherein associated with the common OR function means in each common logic unit there are even-odd selection gates between the group common scan output leads from the groups and the inputs of the common OR function means, and an even selection lead connected to the selection gates from even numbered groups and an odd selection lead connected to the selection gates from odd numbered groups, so that each common logic unit may enable its selection gates to operate with even numbered groups, odd numbered groups, or both, the normal operation being to operate with inputs from all groups, wherein in the event of the timing generators of the two common logic units becoming out of synchronization, the selection gates of the common logic units are enabled so that each common logic unit accepts scan signal only from groups which have their configuration bistable device set for operation with that common logic unit.

15. Multiplexing apparatus as claimed in claim 14, wherein each of the groups has its own individual power supply so that a power supply failure affects only the register-junctors of a single group.

16. Multiplexing apparatus as claimed in claim 15, wherein the signals on the configuration control leads from the two common logic units individually to the groups are supplied in inverted form so that the "0" signal condition is used to set the configuration bistable device for operation with a common logic unit, and wherein there is further provided a common configuration control lead connected to all the groups connected so that a 1 signal condition is required thereon to set the configuration bistable device for operation with that common logic unit, to insure that if a power supply fails or is turned off within certain circuits of the common logic units that the configuration bistable devices will not be set for operation with that common logic unit.

* * * * *